US008800134B2

(12) United States Patent
Hofmann et al.

(10) Patent No.: US 8,800,134 B2
(45) Date of Patent: Aug. 12, 2014

(54) VARIABLE POSITIONING DEVICE FOR POSITIONING AN ELEMENT TO BE CRIMPED IN A CRIMPING TOOL

(75) Inventors: Horst Hofmann, Unterschoenau (DE); Thomas Wagner, Bermbach (DE)

(73) Assignee: Rennsteig Werkzeuge GmbH (DE)

( * ) Notice: Subject to any disclaimer, the term of this patent is extended or adjusted under 35 U.S.C. 154(b) by 1073 days.

(21) Appl. No.: 12/819,968

(22) Filed: Jun. 21, 2010

(65) Prior Publication Data

US 2010/0319191 A1 Dec. 23, 2010

(30) Foreign Application Priority Data

Jun. 19, 2009 (DE) ........................ 10 2009 026 001

(51) Int. Cl.
*B23P 19/00* (2006.01)
*H01R 43/042* (2006.01)

(52) U.S. Cl.
USPC .................. 29/751; 29/753; 29/761; 29/237; 72/403; 72/409.09; 72/409.14

(58) Field of Classification Search
CPC .. B25B 27/10; H01R 43/0425; H01R 43/042; H01R 9/0518; H01R 43/048
USPC .......................... 29/751–758, 768, 237–238; 72/409.11–409.19, 354.2, 403, 409.09
See application file for complete search history.

(56) References Cited

U.S. PATENT DOCUMENTS

| | | | | |
|---|---|---|---|---|
| 3,172,211 A | | 3/1965 | Morris | |
| 4,974,314 A | * | 12/1990 | Nickerson et al. | 29/751 |
| 5,261,263 A | * | 11/1993 | Whitesell | 72/409.19 |
| 5,584,200 A | | 12/1996 | Andersen | |
| 5,625,942 A | | 5/1997 | Casey | |
| 6,155,095 A | | 12/2000 | Beetz | |
| 6,176,116 B1 | * | 1/2001 | Wilhelm et al. | 72/409.12 |
| 7,162,909 B2 | * | 1/2007 | Kelly et al. | 72/409.14 |
| 7,997,116 B2 | * | 8/2011 | Norin | 72/409.11 |
| 2008/0053182 A1 | * | 3/2008 | Goff | 72/354.2 |

FOREIGN PATENT DOCUMENTS

| | | |
|---|---|---|
| DE | 19641218 | 4/1998 |
| DE | 10134004 | 2/2003 |
| DE | 10 2007 005 176 | 8/2008 |
| GB | 367221 | 2/1932 |

* cited by examiner

*Primary Examiner* — Minh Trinh
(74) *Attorney, Agent, or Firm* — Mayer & Williams PC; Mark D. Wieczorek; Ann Wieczorek

(57) ABSTRACT

The present invention relates to a positioning device for positioning an element to be crimped in a crimping tool, for example a wire end sleeve or an electrical connecting plug. The invention further relates to a crimping tool for crimping a connecting element to be situated in a pressing axis. To allow the element that will be crimped to be brought into the pressing axis, the positioning device has a retaining unit for retaining, about its periphery, the element that will be crimped. The retaining unit has a retaining opening which encompasses the pressing axis coaxially. The positioning device further permits the positioning of the element that will be crimped within the pressing axis, in order, in particular, to ensure the necessary insertion depth of the element to be crimped in the crimping tool. For this purpose, the positioning device of the invention has an axial stop, with which the position in the pressing axis of the element to be crimped can be defined. According to the invention, the size of the retaining opening of the retaining unit can be adjusted coaxially in relation to the pressing axis. The size of the retaining opening can therefore be increased and decreased, with a center axis of the retaining opening coinciding with the respective pressing axis. Moreover, the axial stop is displaceable along the pressing axis, allowing different distances from the crimping tool to be realized.

9 Claims, 2 Drawing Sheets

VARIABLE POSITIONING DEVICE FOR POSITIONING AN ELEMENT TO BE CRIMPED IN A CRIMPING TOOL

BACKGROUND OF THE INVENTION

The present invention relates to a positioning device for positioning an element to be crimped in a crimping tool, such as a wire end sleeve or an electrical connecting plug. The invention further relates to a crimping tool for crimping a connecting element to be positioned in a pressing axis in a crimping die having multiple pressing elements.

U.S. Pat. No. 6,155,095 describes a hand tool for crimping electrical connecting plugs in a crimping die. The hand tool has a positioning device for positioning the electrical connecting plug to be crimped. The positioning device is capable of pivoting relative to the crimping die, so that the electrical connecting plug inserted into the positioning device can be pivoted along with the positioning device so as to bring the electrical connecting plug into the area of the crimping die.

A locator for pressing or crimping pliers is known from DE 101 34 004 C1, and is comprised essentially of a clamping bracket to be fastened onto the pliers and a retaining device with retaining pockets. The retaining device is displaceable within the clamping bracket, allowing the locator to be adjusted to various shapes and dimensions of the contact elements to be crimped.

DE 196 41 218 C2 describes a positioning device for crimping pliers, in which a base body has multiple placement and insertion pockets for holding the connecting elements to be crimped. The body can be rotated, in order to bring various placement and insertion pockets into the crimping area.

DE 10 2007 005 176 A1 describes a positioning device for crimping tools having a support head that is rotatable in relation to the crimping tool, with multiple positioning elements being arranged about its periphery. By rotating the support head, the necessary positioning element can be brought into the crimping area. One disadvantage of this solution is that only a limited number of positioning elements can be provided on the support head. Moreover, for every type and size of element to be crimped, a specially configured positioning element is required. This is associated with increased cost, in particular when an electrical connecting element that has been produced in small series for special applications will be positioned in the crimping tool for crimping.

SUMMARY OF THE INVENTION

An object of the present invention is to provide a positioning device for positioning an element to be crimped in a crimping tool, which device can be adapted at low cost to any types and sizes of elements to be crimped. Additionally, a crimping tool will be provided, in which the positioning of the element to be crimped can be adjusted at low cost to different types and sizes of elements to be crimped.

The stated object is attained with a positioning device in accordance with the below description and drawings.

The positioning device of the invention is used for positioning an element to be crimped in a crimping tool. The element to be crimped can be an electrical contact plug, for example, or a wire end sleeve. The crimping tool can be embodied, for example, as hand-held pliers or as a crimping attachment for a crimping machine or for a toggle press. The positioning device ensures that the element to be crimped will be positioned in the proper axis for crimping in the crimping tool. This axis accordingly forms a pressing axis, which represents a center axis of a crimping die of the crimping tool, for example. To allow the element for crimping to be brought into the pressing axis, the positioning device has a retaining unit for retaining the element to be crimped about its periphery. The retaining unit has a retaining opening, which encompasses the pressing axis coaxially. The retaining opening can be a circular opening, for example, which fully encompasses the periphery of the element to be crimped. The retaining opening can, however, also be embodied as individual retaining elements, which hold the element to be crimped at individual points about its periphery, allowing it to be brought into the pressing axis.

The positioning device also allows the positioning of the element to be crimped in the pressing axis, in order to ensure, in particular, the necessary insertion depth into the crimping tool of the element to be crimped. For this purpose, the positioning device of the invention has an axial stop, with which the position in the pressing axis of the element to be crimped can be defined.

According to one aspect of the invention, the size of the retaining opening of the retaining unit can be adjusted coaxially in relation to the pressing axis. The size of the retaining opening can therefore be increased and decreased, with a center axis of the retaining opening coinciding with the respective pressing axis. The axial stop is also displaceable along the pressing axis, so that different distances from the crimping tool can be realized.

The positioning device of the invention has the advantage that it can be adjusted within the limits determined by its structure to any sizes of elements to be crimped, wherein both a proper alignment in relation to the crimping tool and a proper insertion depth into the crimping tool are ensured. The positioning device can thus also be adjusted immediately to new shapes of elements to be crimped, allowing these to be processed without producing a new, specially adapted positioning device.

In one preferred embodiment of the positioning device of the invention, the retaining unit comprises multiple clamping jaws, between which the retaining opening is formed. The clamping jaws grip the element to be crimped at least at multiple points about its periphery. The clamping jaws can be pivoted synchronously, whereby the size of the retaining opening can be adjusted coaxially to the pressing axis.

The pivotable clamping jaws can, for example, have pivoting axes that are arranged perpendicular and spaced somewhat from the pressing axis. In a preferred embodiment of the positioning device of the invention, the clamping jaws have pivoting axes, arranged parallel to and spaced equidistant from the pressing axis. Additionally, the pivoting axes of the clamping jaws are distributed evenly about the pressing axis. In this embodiment, it is ensured to a high degree that the size of the retaining opening is modified coaxially to the pressing axis when the clamping jaws are pivoted synchronously.

The pivoting axes of the clamping jaws are preferably formed on a body of the positioning device, for example as pins or bolts which are fastened to the base body. In this case, the clamping jaws each have a pivoting pin, which is guided in an adjusting ring that is capable of rotating in relation to the body about the pressing axis. A rotation of the adjusting ring therefore causes the pivoting pins to be displaced in relation to the pivoting axes, thereby pivoting the clamping jaws. As a result, rotating the adjusting ring results in a change in the size of the retaining opening. The pivoting pins can each be configured as a single piece with the clamping jaws.

The adjusting ring can preferably be fixed in relation to the body by means of a fastening screw, wherein the adjusting ring has a marking, which is moved over an indexed scale, applied to the body, when the adjusting ring is rotated. This type of embodiment allows the positioning device to be pre-adjusted, adapting the positioning device to the element to be crimped. The indexed scale can be embodied, for example, to indicate the diameter of the retaining opening, so that a user can set the diameter of the element to be crimped by rotating the adjusting ring and reading the indexed scale. The tightening screw is then tightened, to ensure that the setting of the adjusting ring is not inadvertently altered. Alternatively, the indexed scale can be applied to the adjusting ring, with the marking being provided on the body.

In one particular embodiment of the positioning device of the invention, the adjusting ring is connected to an actuating device, wherein a force limiting device is situated within the flow of force between the actuating device and the clamping jaws. This embodiment permits an automatic adjustment of the positioning device. To accomplish this, first the element to be crimped is placed in the positioning device. By actuating the actuating device, the adjusting ring is rotated, thereby decreasing the size of the retaining opening of the retaining unit until the clamping jaws hold the element to be crimped about its periphery. To prevent the clamping jaws from exerting a force on the element to be crimped which may lead to an undesirable deformation of the element to be crimped, the force limiting device limits the force exerted on the clamping jaws and thus on the element to be crimped. The force limiting device can be a sliding coupling or a flexible coupling which absorbs the increasing force. The actuating device can be capable of being coupled to an actuator of the crimping tool, allowing the positioning and crimping of the element to be crimped to be executed in a single step.

In a further special embodiment, the clamping jaws are forced by spring elements in the direction of the pressing axis. This embodiment can also be provided for an automatic adjustment of the retaining unit. Alternatively, this type of embodiment can also serve to limit the force applied to the clamping jaws, and thus to the element to be crimped, by the user for the purpose of a pre-adjustment, thereby preventing any undesirable deformation of the element to be crimped, or damage to the positioning device.

The axial stop is preferably embodied as an adjusting screw, the rotational axis of which lies in the pressing axis. The adjusting screw enables a precise adjustment of the distance of the axial stop from the crimping tool.

The adjusting screw preferably has a stop pin, shaped as a hollow cone situated in the pressing axis and open in the direction of the element to be crimped. The hollow cone shape ensures that when the element to be crimped is stopped by the axial stop, its ends are also forced into the pressing axis. This prevents the element to be crimped from becoming tilted inside the retaining opening.

The adjusting screw preferably rests on a threaded pin, to which an indexed scale is applied. The indexed scale can indicate the length of the element to be crimped, for example. This enables a pre-adjustment to the length of the element to be crimped. The threaded pin is attached, for example, to the body of the positioning device.

The adjusting screw can preferably be blocked in relation to the threaded pin with a securing device, in order to prevent a chosen pre-setting from becoming inadvertently displaced. Alternatively, the adjusting screw can be embodied as difficult to move.

The crimping tool of the invention is used for crimping a connecting element, to be located in a pressing axis, in a crimping die comprising multiple pressing elements. The crimping tool can be hand-held pliers or a crimping die for a crimping machine, for example. The pressing elements can be embodied as notched elements, for example, which can be moved concentrically in relation to one another in the crimping die. The pressing elements can also be formed by two pressing jaws, however, which are moved in relation to one another in hand-held pliers. The crimping tool of the invention has a positioning device of the invention, situated to the side of the crimping die in relation to the pressing axis.

A special embodiment of the crimping tool of the invention comprises a variant of the positioning device of the invention, in which the adjusting ring is connected to an actuating device, wherein a force-limiting device is situated in the flow of force between the actuating device and the clamping jaws. The actuating device of the positioning device is coupled to an actuating element of the crimping tool. The actuating element of the crimping tool can be a hand lever, for example, of a crimping tool embodied as hand-held pliers, or an actuator of a crimping tool embodied as a crimping machine. With this embodiment of the crimping tool of the invention, initiating the process for crimping the inserted connecting element first causes the connecting element to be properly positioned in the positioning device, with adjustment to the type and size of the connecting element to be crimped occurring automatically.

Additional advantages, details and modifications of the invention are specified in the following description of a preferred embodiment, in reference to the set of drawings.

DETAILED DESCRIPTION OF THE INVENTION

Figure 1:
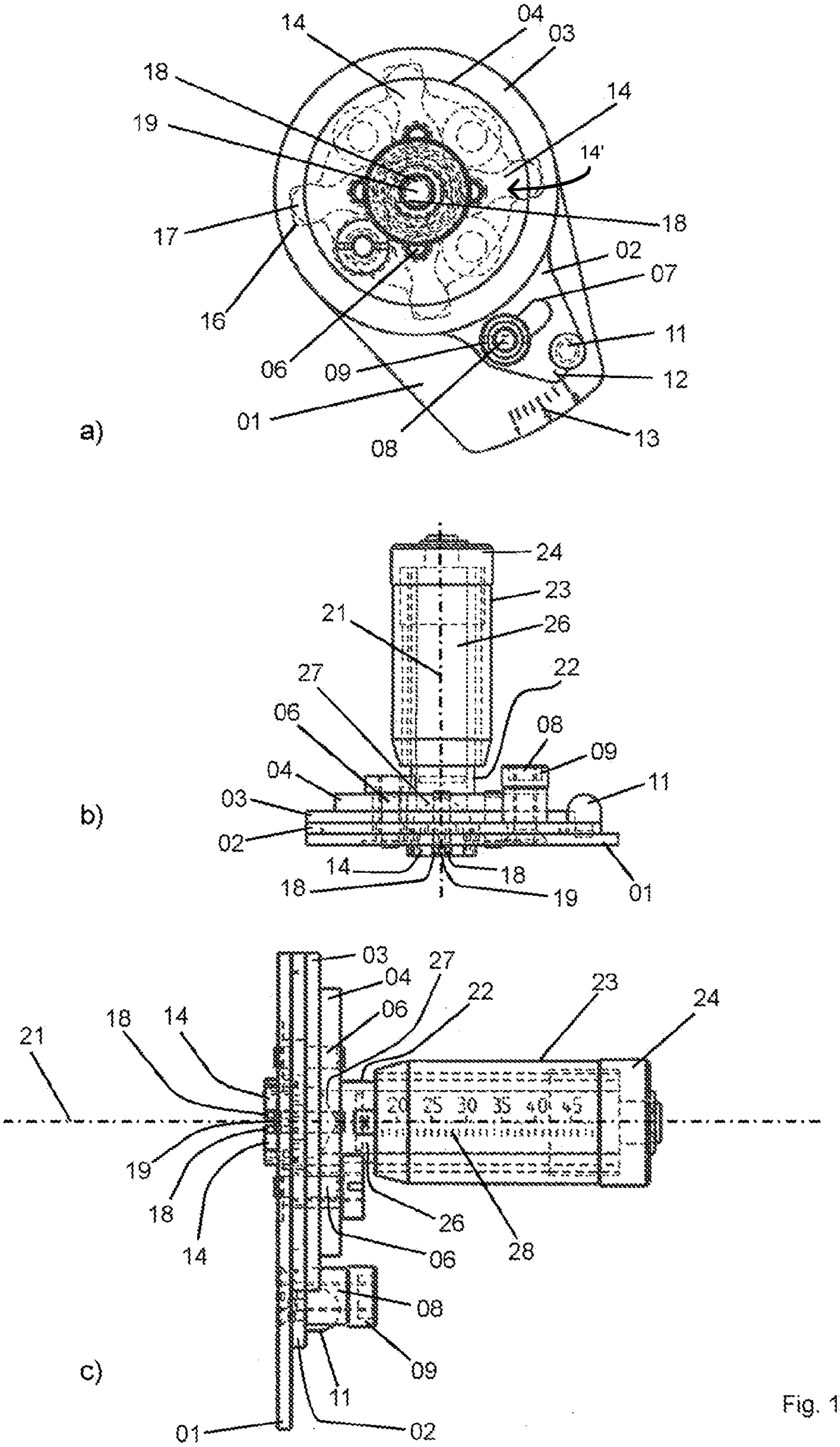
FIG. 1 is a preferred embodiment of a positioning device described herein from three points of view.

FIG. 1 shows a preferred embodiment of a positioning device of the invention from three points of view. Diagram a) of FIG. 1 shows a view from the top, diagram b) shows a view from the front, and diagram c) shows a side view. The positioning device is provided for mounting on a crimping tool, in particular, to be situated laterally next to a crimping die of the crimping tool. With the help of the positioning device, it is possible to position an element to be crimped in the crimping tool, such that it will undergo the necessary deformation in the crimping tool.

The positioning device comprises a body 01, which is made from a sheet of tool steel, for example. The outer shape of the flat body 01 is circular, with one side that is widened. The positioning device further comprises an adjusting ring 02, which is also made from a sheet of tool steel and has a circular outer shape, with one side that is widened. The circular outer shape of the body 01 and the circular outer shape of the flat adjusting ring 02 are equal in size and arranged overlapping one another. A guide ring 03, also made from a sheet of tool steel and having a circular outer shape, is arranged on the adjusting ring 02. The circular outer shape of the flat guide ring 03 has the same diameter as the circular outer shape of the adjusting ring 02. Resting on the guide ring 03 is a clamping plate 04, which also has a circular outer shape, wherein the diameter of the circular outer shape of the clamping plate 04 is smaller than the diameter of the circular outer shape of the guide ring 03. The circular outer shapes of the body 01, the adjusting ring 02, the guide ring 03 and the clamping plate 04 are arranged coaxially in relation to one another. The body 01, the guide ring 03 and the clamping plate 04 are securely connected to one another by four pins 06.

The adjusting ring 02 is rotatable in relation to the body 01 about the shared axis of their circular outer shapes. The rotation of the adjusting ring 02 in relation to the body 01 is limited to an angle of rotation of approximately 20° by a guide link 07, formed in the expanded area of the circular outer shape of the adjusting ring 02, being guided by a guide pin 08, which is securely attached to the body 01. The guide pin 08 is equipped with threading, on which a tightening screw 09 rests. Tightening the tightening screw 09 presses the adjusting ring 02 against the body 01, thereby preventing the adjusting ring 02 from rotating in relation to the body 01. Also resting on the expanded section of the circular outer shape of the adjusting ring 02 is a semicircular actuating aid 11, which makes it easier for a user to exert torque on the adjusting ring 02 in order to rotate it. On the expanded section of the circular outer shape of the adjusting ring 02, a bar-type marking 12 is applied, which is moved over an indexed scale 13 applied to the body 01 when the adjusting ring 02 is moved in relation to the body 01.

The four pins 06 further serve as pivoting axes for four identically embodied clamping jaws 14, which are arranged essentially between the body 01 and the guide ring 03. The adjusting ring 02 has four evenly distributed guide openings 16 on its inner side, with a pivoting pin 17 of one of the clamping jaws 14 being guided in each of said openings. By rotating the adjusting ring 02 in relation to the body 01, the pivoting pins 17 of the clamping jaws 14 are displaced in relation to the pivoting axes formed by the pins 06, resulting in a pivoting of the clamping jaws 14 and especially a displacement of the holding surfaces 18 of the clamping jaws 14. In this, the distance between the holding surfaces 18 changes. Between the holding surfaces 18, a retaining opening 19 is formed, in which the entire element to be positioned is taken out. The multiple clamping jaws 14 with the retaining opening 19 form a retaining unit 14'. A center axis between the holding surfaces 18, which is also a center axis of the retaining opening 19, forms a pressing axis 21 of the element to be crimped that can be positioned by the positioning device. The axes of the circular outer shapes of the body 01, the adjusting ring 02, the guide ring 03 and the clamping plate 04 also lie in the pressing axis 21. The four pins 06 and the four clamping jaws 14 are arranged equidistant from the pressing axis 21 and are distributed evenly about the pressing axis 21. Therefore, the angle between two adjoining pins 06 or between two adjoining clamping jaws 14 relative to the pressing axis 21 is 90°. In particular, the four holding surfaces 18 of the clamping jaws 14 are also each the same distance from the pressing axis 21, regardless of the degree to which the four clamping jaws 14 are pivoted about the pins 06. Thus the center point of the retaining opening 19, the size of which can be modified, always lies within the pressing axis 21. The indexed scale 13 indicates the diameter of the retaining opening 19 in mm.

The clamping plate 04 has a threaded pin 22, which is arranged coaxially in relation to the pressing axis 21. On the threaded pin 22 rests an adjusting screw 23 with internal threading that matches the first. The adjusting screw 23 is also arranged coaxially in relation to the pressing axis 21. By rotating the adjusting screw 23 about the pressing axis 21, the adjusting screw 23 is screwed onto the threaded pin 22, thereby changing the distance from the adjusting screw 23 to the clamping plate 04 and to the body 01. The adjusting screw 23 is embodied as sleeve-shaped and has an adjusting screw head 24 at the outer end of the sleeve part, with the head being connected to a stop pin 26, which is guided without play in the interior of the threaded pin 22. The stop pin 26 is also arranged coaxially in relation to the pressing axis 21. When the adjusting screw 23 is rotated, the stop pin 26 of the adjusting screw 23 is displaced, together with the adjusting screw 23, along the pressing axis 21. The stop pin 26 is shaped as an open, hollow cone in the area of a stop surface 27, also termed an axial stop. The hollow-cone shaped stop surface 27 is open in the direction of the retaining opening 19. The hollow-cone shape of the stop surface 27 is also arranged coaxially in relation to the pressing axis. The threaded pin 22 has an indexed scale 28, which is unblocked based upon the position of the adjusting screw 23. The indexed scale 28 indicates the distance of the stop surface 27 from the crimping die of the crimping pliers in mm.

Figure 2:
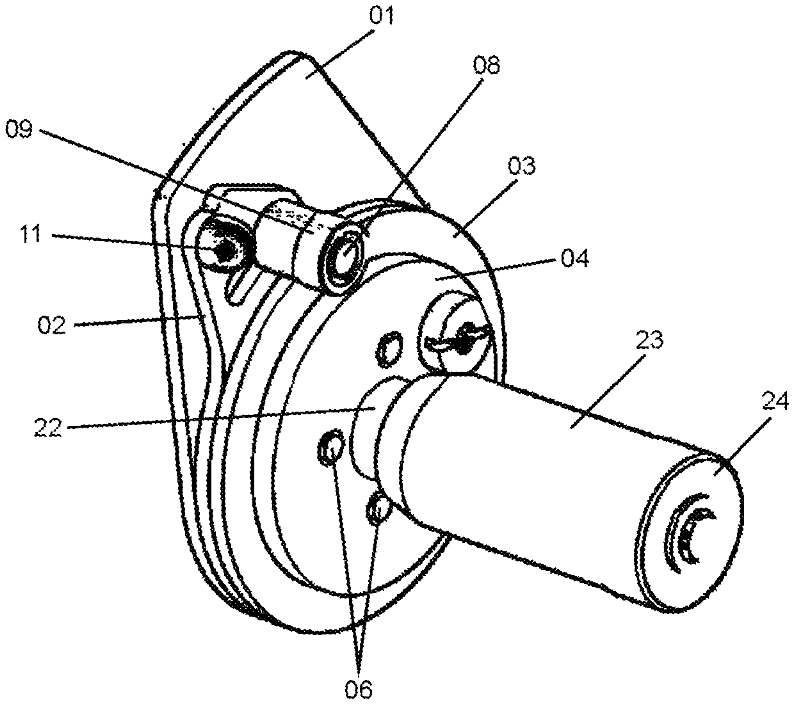
FIG. 2 is a perspective view of the positioning device shown in FIG. 1.

FIG. 2 shows a perspective view of the positioning device shown in FIG. 1. In particular, the body 01, the adjusting ring 02, the clamping plate 04, the adjusting screw 23 and the tightening screw 09 are shown.

Figure 3:
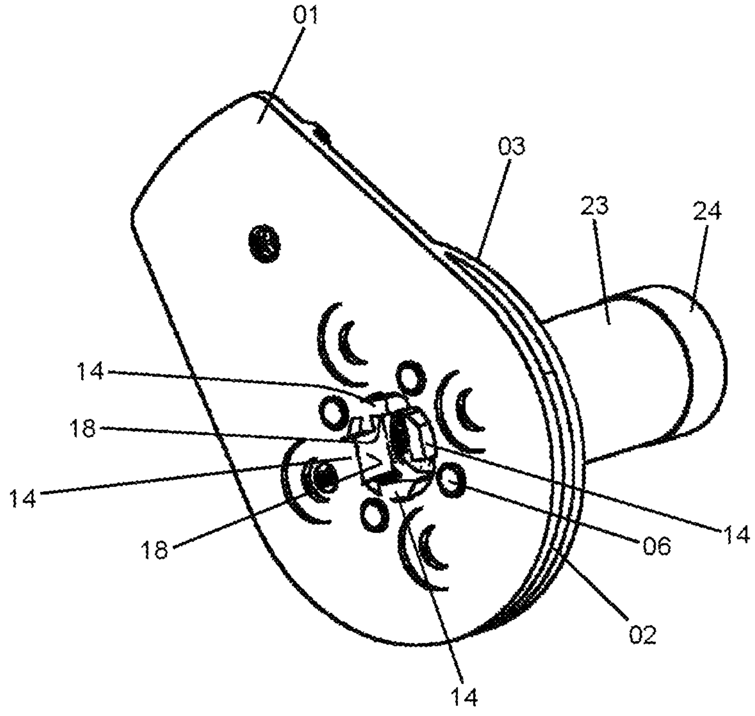
FIG. 3 is another perspective view of the positioning device shown in FIG. 1.

FIG. 3 shows an additional perspective view of the positioning device shown in FIG. 1. In particular, the body 01, the four clamping jaws 14 with the stop surfaces 18, the adjusting screw 23 and the guide ring 03 are shown.

The invention claimed is:

1. A variable positioning device for positioning an element to be crimped in a crimping tool, the device comprising:

a retaining unit for retaining, about its periphery, the element to be crimped, within a retaining opening of the retaining unit that encompasses a pressing axis coaxially, and an axial stop for positioning the element to be crimped in the pressing axis, wherein the size of the retaining opening of the retaining unit is adjustable coaxially in relation to the pressing axis, and in that the axial stop is displaceable along the pressing axis;

wherein said retaining unit comprises multiple clamping jaws, between which the retaining opening is formed, wherein the clamping jaws are synchronously pivotable, and wherein said multiple clamping jaws have pivoting axes arranged parallel to and equidistant from the pressing axis, and distributed evenly about the pressing axis, and wherein the pivoting axes of said clamping jaws are formed on a body of the positioning device, and wherein said multiple clamping jaws each have a pivoting pin, which is guided in an adjusting ring, which is rotatable in relation to the body about the pressing axis.

2. The positioning device as claimed in claim 1, wherein the adjusting ring is secured in relation to the body with a tightening screw, and in that the adjusting ring has a marking, which is moved along an indexed scale applied to the body when the adjusting ring is rotated.

3. The positioning device of claim 1, wherein the adjusting ring is connected to an actuating device, wherein a force limiting device is situated in the flow of force between the actuating device and the clamping jaws.

4. The positioning device of claim 3, wherein the force limiting device is embodied as a sliding coupling or a flexible coupling.

5. The positioning device of claim 1, wherein the clamping jaws are forced by spring elements in the direction of the pressing axis.

6. The positioning device of claim 1, wherein said axial stop is embodied as an adjusting screw, the rotational axis of which lies along the pressing axis.

7. The positioning device of claim 6, wherein the adjusting screw has a stop pin in the shape of a hollow cone, which is arranged in the pressing axis and is open in the direction of the element to be crimped.

8. The positioning device of claim 6, wherein the adjusting screw rests on a threaded pin on which an indexed scale is applied.

9. The positioning device of claim 8, wherein the adjusting screw is blocked in relation to the threaded pin with a securing device.

* * * * *